US012524692B2

(12) United States Patent
Rajendran et al.

(10) Patent No.: US 12,524,692 B2
(45) Date of Patent: Jan. 13, 2026

(54) PROTOCOLS TO EXPLOIT NON LINEAR QUANTUM MECHANICS

(71) Applicants: Surjeet Rajendran, Ellicott City, MD (US); David Elazzar Kaplan, Baltimore, MD (US)

(72) Inventors: Surjeet Rajendran, Ellicott City, MD (US); David Elazzar Kaplan, Baltimore, MD (US)

(73) Assignees: Surjeet Rajendran, Ellicott City, MD (US); David E. Kaplan, Baltimore, MD (US)

( * ) Notice: Subject to any disclaimer, the term of this patent is extended or adjusted under 35 U.S.C. 154(b) by 807 days.

(21) Appl. No.: 17/843,752

(22) Filed: Jun. 17, 2022

(65) Prior Publication Data
US 2023/0051780 A1    Feb. 16, 2023

Related U.S. Application Data

(60) Provisional application No. 63/212,642, filed on Jun. 19, 2021.

(51) Int. Cl.
*G06N 10/20*    (2022.01)
(52) U.S. Cl.
CPC ................................... *G06N 10/20* (2022.01)
(58) Field of Classification Search
CPC ........................................................ G06N 10/20
USPC .............................................................. 706/62
See application file for complete search history.

(56) References Cited

U.S. PATENT DOCUMENTS

| | | | | |
|---|---|---|---|---|
| 5,768,297 A * | 6/1998 | Shor | ...................... | H03M 13/03 714/763 |
| 5,972,744 A * | 10/1999 | Morimoto | .............. | H10D 30/43 257/17 |
| 7,135,697 B2 * | 11/2006 | Friesen | .................. | B82Y 10/00 257/14 |
| 2003/0002670 A1* | 1/2003 | Wang | .................... | H04L 9/0852 505/181 |
| 2007/0104420 A1* | 5/2007 | Franson | ................. | G06N 10/40 708/250 |
| 2013/0222801 A1* | 8/2013 | Harel | ....................... | G01J 3/447 356/300 |
| 2017/0060534 A1* | 3/2017 | Sanguinetti | ............. | G06F 17/16 |
| 2018/0157986 A1* | 6/2018 | Oxford | .................. | G06N 10/20 |
| 2019/0049495 A1* | 2/2019 | Ofek | ...................... | G06N 10/70 |
| 2020/0049776 A1* | 2/2020 | Wood | ................... | G01R 33/307 |

(Continued)

*Primary Examiner* — Reza Nabi

(57) ABSTRACT

Protocols to exploit non-linear quantum mechanical effects to parallelize any process (such as computational, mechanical or biological), inhibit the dilution of non-linear quantum mechanical effects and enhance the shot noise limit of quantum measurement devices are described. The key concept behind these protocols is the use of a device that can communicate across different arms of a quantum superposition even in the presence of decoherence using non-linear quantum mechanical interactions (such as the expectation values of classical sources of electromagnetism and gravitation). By communicating across different arms of a quantum superposition, the protocol can collect the results of parallelizable tasks performed in each arm of the superposition, arrive at well defined final states across the superposition and use the strength of the observed non-linearity to measure the properties of the superposition itself.

1 Claim, 3 Drawing Sheets

Protocol to implement parallelizable tasks using non-linear quantum mechanical interactions

(56) References Cited

U.S. PATENT DOCUMENTS

| | | | | |
|---|---|---|---|---|
| 2020/0064709 | A1* | 2/2020 | Li | G02F 1/3536 |
| 2021/0302513 | A1* | 9/2021 | Perelshtein | G06F 17/14 |
| 2022/0366314 | A1* | 11/2022 | Vall-Ilosera | G06N 10/80 |
| 2023/0024072 | A1* | 1/2023 | Ji | G02B 6/1225 |
| 2023/0177377 | A1* | 6/2023 | Oh | G06N 3/084 |
| | | | | 716/100 |
| 2023/0244977 | A1* | 8/2023 | Li | G06N 10/40 |
| | | | | 702/189 |
| 2023/0261762 | A1* | 8/2023 | Brodsky | H04B 10/079 |
| | | | | 398/25 |
| 2024/0005195 | A1* | 1/2024 | Griffin | G06N 10/00 |
| 2024/0095574 | A1* | 3/2024 | Griffin | G06N 10/20 |
| 2024/0103143 | A1* | 3/2024 | Chiaramida | G01S 7/4873 |
| 2024/0385321 | A1* | 11/2024 | Wang | G01S 7/4912 |
| 2025/0103939 | A1* | 3/2025 | Lisenfeld | G06N 10/70 |

\* cited by examiner

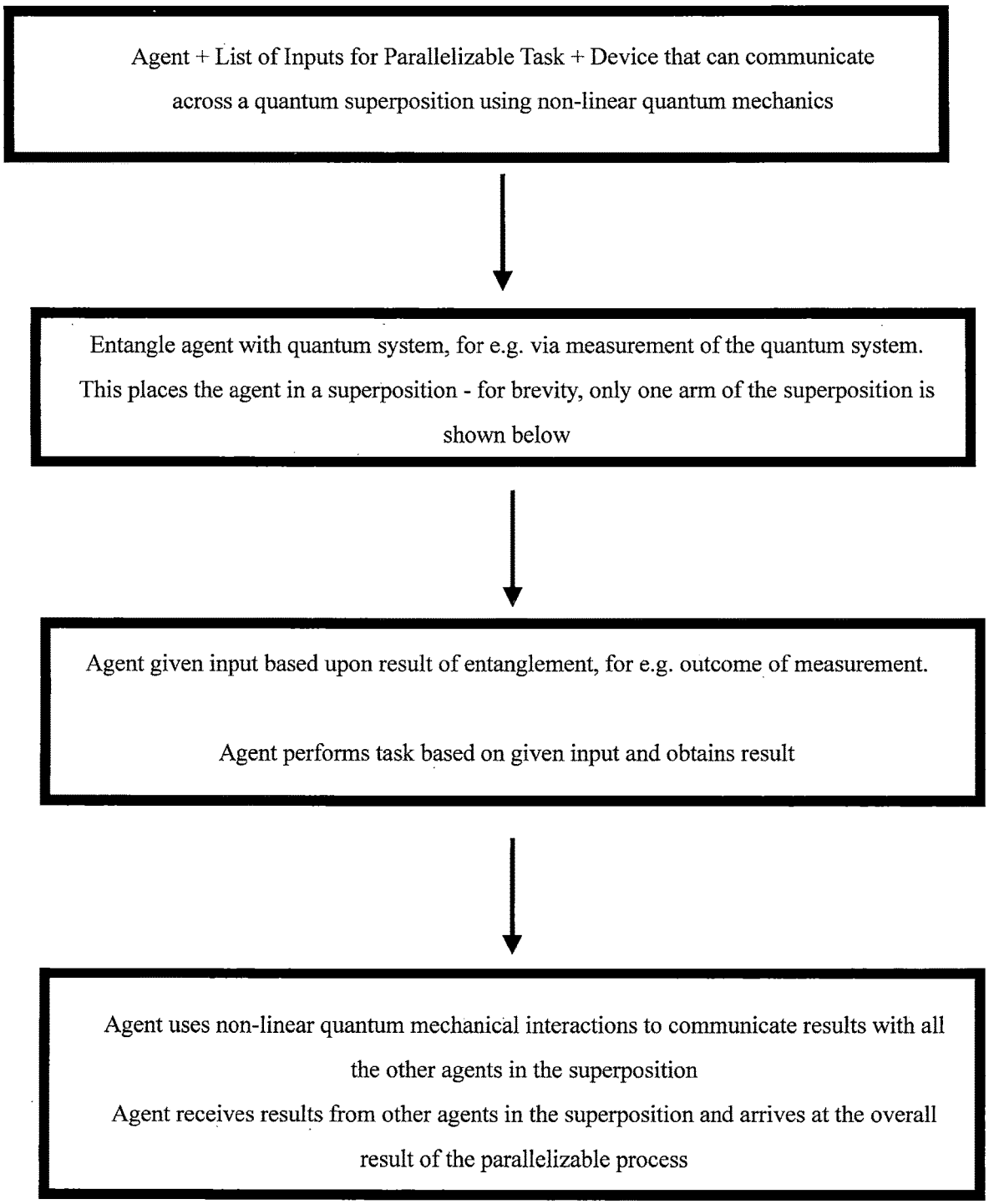
Figure 1: Protocol to implement parallelizable tasks using non-linear quantum mechanical interactions

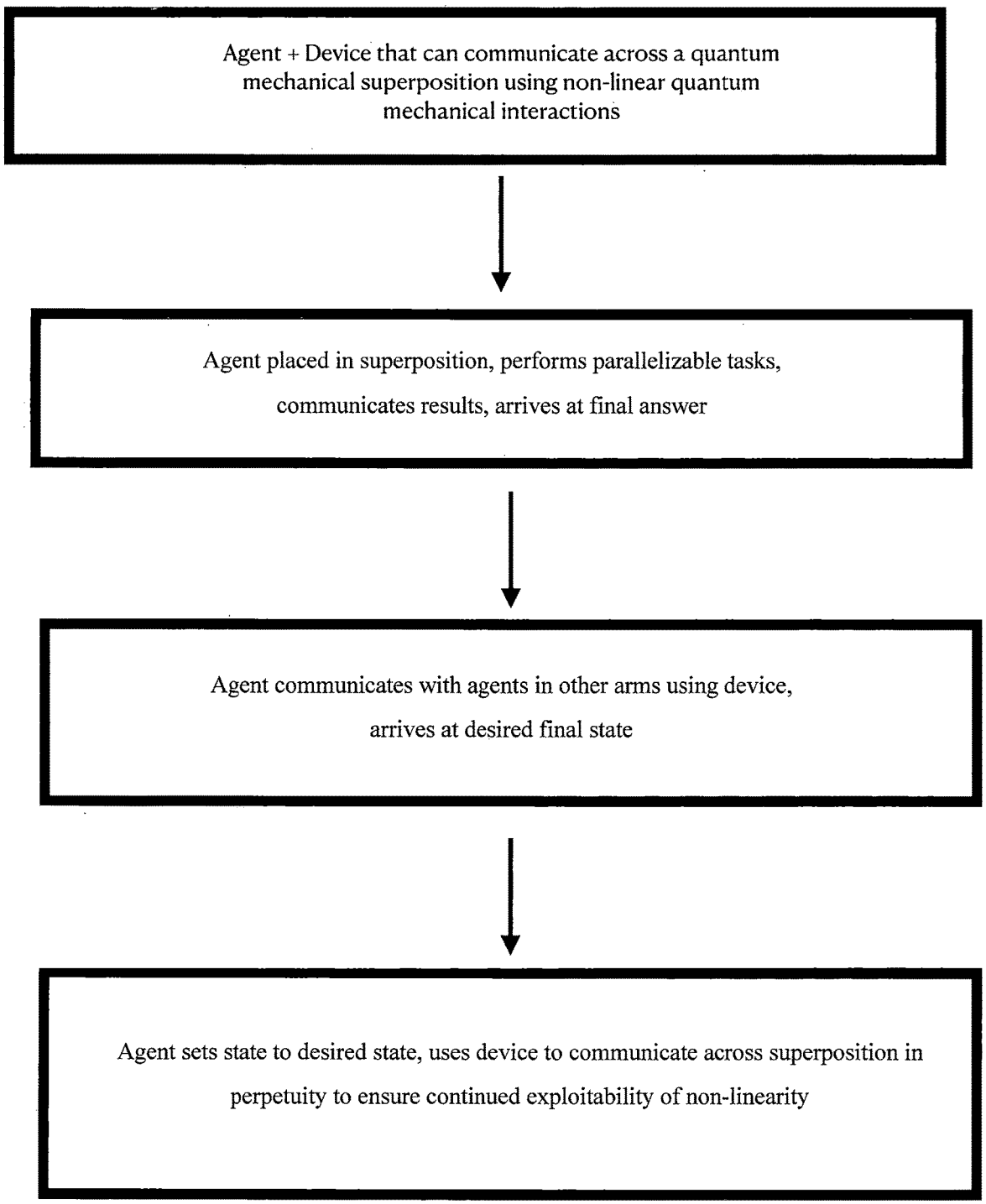
Figure 2: Protocol to inhibit dilution of non-linear quantum mechanical effects while performing parallelizable tasks. Other permutations of operations possible, as described in text

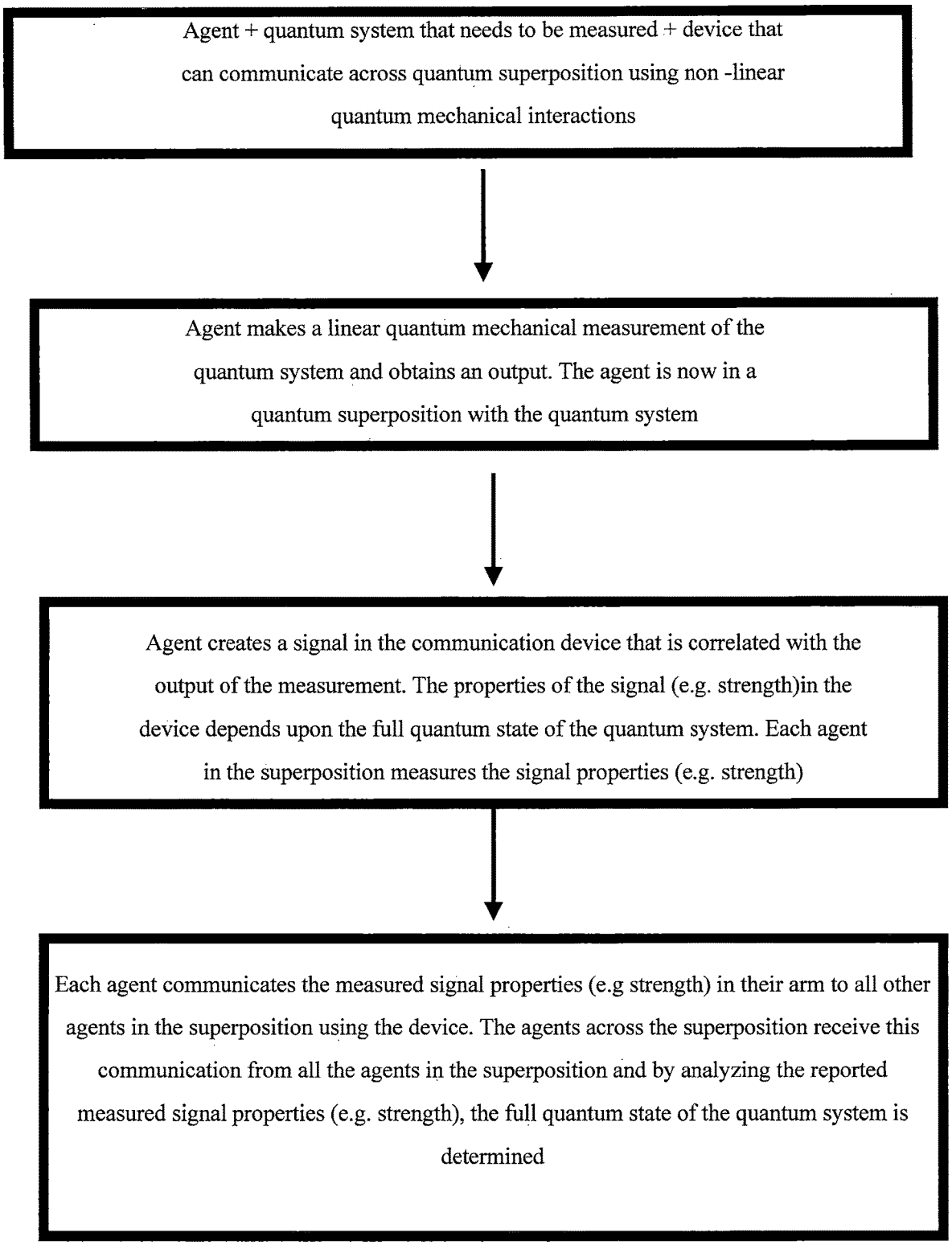
Figure 3: Protocol to enhance the shot noise limit of quantum sensors

PROTOCOLS TO EXPLOIT NON LINEAR QUANTUM MECHANICS

FIELD OF INVENTION

The protocols described herein relate generally to the use of communication across a quantum superposition to execute parallelizable classical tasks such as computing. This communication can also be used to enhance the sensitivity of quantum sensors.

BACKGROUND

A variety of applications have been proposed that exploit linear quantum mechanical interactions. These applications include quantum computing, communication and sensing. In these, a quantum system is placed in an appropriate quantum mechanical superposition and allowed to evolve in time. The desired information is obtained from this quantum system by measuring its quantum state after a suitable time. In linear quantum mechanical systems, it is critical that the quantum state of the system remains quantum coherent between the time when the system is placed in a quantum superposition and when it is measured. Scalable maintenance of quantum coherence is a technologically challenging task.

The information in a quantum state can be extracted even in the presence of decoherence [1,2] using non-linear quantum mechanical interactions [3], enabling scalable applications of quantum technologies that are based on quantum superpositions [2].

SUMMARY

Protocols to exploit non-linear quantum mechanical effects to implement any (for example, computational, mechanical or biological) parallelizable process, inhibit the dilution of non-linear quantum mechanical effects during the performance of this process or due to the general time evolution of the system and enhance the sensitivity of quantum sensors are described.

The key concept that enables these protocols is the fact that communication across different arms of a quantum superposition is possible using non-linear quantum mechanical interactions. Such communication is impossible using linear quantum mechanical interactions. These non-linear quantum mechanical interactions are most efficiently accessed via classical sources [2] of electromagnetism (such as magnetic fields, radio waves and lasers) and gravitation, but it is possible to use many other interactions as well. In general, a device that can communicate across the quantum mechanical superposition consists of a source that can produce a non-linear quantum mechanical interaction and a detector that can detect these interactions. An example of such a device would be an emitter of radio waves and a detector of radio waves. In this case, the non-linear quantum mechanical interaction is the interaction between the expectation value of the electromagnetic field produced by the radio waves and the electrons in the emitter/detector of the radio waves. The key point is that when the radio source in a superposition creates a classical electromagnetic field, the expectation value of this field is non-zero even when there is decoherence [2]. Since this expectation value is non-zero, the information carried in the expectation value can be detected across the arms of the superposition using the non-linear quantum mechanical interaction between the expectation value of the electromagnetic field and the electrons in a radio detector, enabling communication [2]. Many other such devices can be constructed. In general, an agent will send and receive information through this device. The agent will also process the information and act on it. An example of such an agent would be a computer, machine or human. Many other such agents are also possible.

By communicating across different arms of a quantum superposition, the protocol can collect the results of parallelizable tasks performed in each arm of the superposition, help a system that is in a superposition to arrive at well defined states to preserve the continued exploitability of non-linear quantum mechanical effects and use the strength of the observed non-linearity to measure the properties of the superposition itself.

DRAWINGS

FIG. 1: Protocol to use non-linear quantum mechanical interactions to perform parallelizable processes FIG. 2: Protocol to inhibit dilution of non-linear quantum mechanical interactions while performing parallelizable tasks or during general time evolution. Other permutations of the order listed above are possible, as discussed in the text FIG. 3: Protocol to improve the shot noise of quantum sensors using non-linear quantum mechanical interactions

DESCRIPTION

A general description of a parallelizable task is one in which there is an agent (for example, computer, machine or human) who is given a list of inputs. The agent executes a defined task on each input, obtains a result on each input, collects the results obtained for all the inputs, analyzes the collected results and arrives at a decision based on this analysis. Non-linear quantum mechanical effects can be used to implement such parallelization using the following protocol (see FIG. 1 for an illustration):

(1) In a parallelizable process, the agent performing the task is given access to a device that can communicate across a quantum mechanical superposition using non-linear quantum mechanical interactions. The agent is also furnished with a list of inputs.

(2) The agent is placed in a quantum mechanical superposition. This superposition is achieved by entangling the quantum state of the agent with the quantum state of another quantum system. This process is most easily implemented via the act of measurement (similar to the implementation in [4]), but other mechanisms are possible.

(3) Upon creation of this superposition, the agent is provided with an input (for example, from a pre-existing list of inputs) that depends upon the outcome of the entanglement, for example, the outcome of the measurement process.

(4) Based on this input, the agent performs the requisite task and arrives at a result.

(5) In each arm of the superposition, the agent uses non-linear quantum mechanical interactions to communicate the results of that agent to all the other agents in the superposition. For example, this can be accomplished by the agent in each arm producing a classical electromagnetic signal from a radio emitter. This classical signal changes the expectation value of the electromagnetic field which is a non-linear quantum mechanical observable.

(6) In each arm of the superposition, the agent in that arm collects the results from all the other agents in the superposition by detecting the non-linear quantum mechanical observable (for example, the expectation value of the electromagnetic field, in the superposition via a radio detector), analyzes all the collected results and comes to a decision based on this analysis. The collection and analysis of the results may be performed by each agent (or their representative) in each arm of the superposition.

(7) It is efficient for the assignation of the input to the agent based on the outcome of the entanglement to be decided prior to the agent being placed in the quantum mechanical superposition. However, this assignation can also be performed after the quantum mechanical superposition has been created by using non-linear quantum mechanical interactions to communicate across the superposition so that the agents in the superposition can agree to work on different inputs.

(8) Similarly, it is also efficient for the agent to agree on a communication protocol prior to the agent being placed in the quantum mechanical superposition. But, this communication protocol could also be performed after the quantum mechanical superposition has been created using the non-linear quantum mechanical interactions to communicate across the superposition to agree on a protocol.

As an example of the above protocol, consider a computing problem where a function F needs to be computed on N given inputs $I_1, I_2 \ldots I_N$, yielding the numbers $F[I_1], F[I_2] \ldots F[I_N]$. The goal of the computation is to find the input $I_k$ which yields the smallest number in the set $F[I_1], F[I_2] \ldots F[I_N]$. In a classical computer, this problem is solved by computing the function F sequentially on the inputs $I_1, I_2 \ldots I_N$ and comparing the results $F[I_1], F[I_2] \ldots F[I_N]$ at the end of the sequential computation. In the classical computation, sequential computation of the numbers $F[I_1], F[I_2] \ldots F[I_N]$ implies that the utilization of classical resources (e.g. time for the computation) scales linearly with the number of inputs N. This would be a challenge if the computation of $F[I_k]$ is resource intensive (e.g. takes a long time).

This problem can be efficiently solved using the above non-linear quantum mechanical protocol. We take a single computer, a single emitter of radio waves, a single detector of radio waves and a, quantum system whose Hilbert space is at least of dimension N. The latter can be accomplished for example by taking a system of approximately $\text{Log}_2 [N]$ quantum spins each of which have two spin states. The quantum spins are all placed in an initial state that is a superposition of the two spin states. For example, if the spin states are spin up and down along the z direction, the quantum spins can all be initially placed in the spin up direction along the x direction. The system can now be placed in a quantum mechanical superposition with N arms by measuring the spin along the z direction.

Each arm of the superposition is associated with a unique combination of spin outcomes. For example, one arm would have measured all the spins to be up, another would have seen all the spins to be down and a third would see some unique combination of spin up and down. Using a predetermined assignation of the measured spin outcomes to the inputs $I_1, I_2 \ldots I_N$ the computer in the $k^{th}$ arm is given the input $I_k$. An example of this pre-determined assignation could be the decision to send input $I_1$ to the computer if all the spins are measured to be spin up along the z direction and input $I_N$ to the computer if all the spins are measured to be spin down along the z direction. In each arm of the superposition, the computer calculates the function on the input given to it in that arm. For example, in the arm where all the spins were measured to be spin up along the z direction, the computer calculates $F[I_1]$ while in the arm where all the spins were measured to be spin down, the computer calculates $F[I_N]$. Thus, the result of $F[I_k]$ is known in the $k^{th}$ arm of the superposition. All of the above can be performed using linear quantum mechanical interactions. However, using linear quantum interactions, the results of the computation in each arm of the superposition cannot be communicated to the other arms.

The use of non-linear quantum mechanical interactions [3] permits communication of the results of the computation in any arm of the superposition to the rest of the superposition even in the presence of environmental decoherence [1, 2]. This communication can be accomplished, for example, using the expectation value of classical sources of electromagnetism such as an emitter of radio waves, following a pre-determined protocol. One example of a pre-determined protocol would be for each arm to communicate its results across the superposition sequentially with the order in the sequence being determined by the measured spin outcomes in that arm. For example, the arm where all the spins were measured to be spin up along the z direction would communicate its results first and the arm where all the spins were measured to be spin down along the z direction would communicate its results last.

The communication of the results can be performed with a radio source as follows. At its designated time in the sequence, the $k^{th}$ arm turns on its radio source and communicates the results of its computation of $F[I_k]$ using conventional encoding of information onto radio waves. This information is now present in the expectation value of the electromagnetic field which is the non-linear quantum mechanical interaction being exploited in this example. During this time, the other arms of the superposition use detectors of radio waves to listen to the communication from the $k^{th}$ arm using non linear quantum mechanical interactions i.e. the interaction between the expectation value of the electromagnetic field and the radio detector in each arm. This communication is not possible using linear quantum mechanical interactions but is possible using non-linear quantum mechanical interactions even in the presence of decoherence. Upon receipt of this communication, every arm of the superposition is now aware of the computed value of $F[I_k]$. After all the N arms of the superposition have communicated using the non-linear quantum mechanical interactions, the results of $F[I_1], F[I_2] \ldots F[I_N]$ are known across the entire superposition. In each arm of the superposition, the minimum value in the set $F[I_1], F[I_2] \ldots F[I_N]$ can be determined, thus identifying the input $I_k$ that is the minimum in the set $F[I_1], F[I_2] \ldots F[I_N]$ in every arm of the superposition. The advantage of this method is that the resource intensive computation of $F[I_k]$ was parallelized—each arm of the interferometer only performed one resource intensive computation. Thus, the resource intensive computation of $F[I_1], F[I_2] \ldots F[I_N]$ no longer scales linearly in the number N of inputs.

The above protocol can also be applied to solve parallelizable problems beyond computation. For example, consider the problem of baggage inspection at an airport. Given N bags $B_1, B_2, \ldots B_N$ and a single classical baggage inspection machine, the machine needs to sequentially scan each bag to ensure that prohibited items are not present in any of those bags. The resource cost (e.g. time) of scanning N bags increases linearly with N. This problem can be solved efficiently using the above non-linear quantum mechanical protocol.

We take a single baggage inspection machine, a single emitter of radio waves, a single detector of radio waves and a quantum system whose Hilbert space is at least of dimension N. Similar to the implementation of the parallelizable computational task described above, the system is placed in a quantum mechanical superposition with N arms by placing the quantum system in a suitable initial state and performing a suitable measurement on it. Using a pre-determined assignation of measurement outcomes to a bag Bk in the set $B_1$, $B_2$, ... $B_N$, the baggage inspection machine in the $k^{th}$ arm of the superposition scans the bag $B_k$. After the screening is complete, each arm uses the pre-determined communication protocol to convey the results of its scan using the radio emitter in its arm. This radio communication is detected across the superposition using the radio receiver in all the other arms of the superposition via the non-linear quantum mechanical interaction. The result of scanning all the N bags is thus known across the full superposition. Since the scanning of all the bags takes place in parallel across the entire superposition, the resource cost (e.g. time) associated with the scan is the resource cost associated with the scanning of a single bag. The resource intensive scanning of all the bags $B_1$, $B_2$, ... $B_N$ no longer scales linearly in the number of inputs N.

To preserve the exploitability of non-linear quantum mechanical interactions, it is important that the agents (for example, computer, machine or human) across the superposition are in classical states that are known across the superposition [2]. To ensure this preservation, the following protocol can be used (see FIG. 2 for an illustration):

(1) Prior to the agents being placed in the quantum mechanical superposition, the agent is provided access to a device that is capable of communicating across the quantum mechanical superposition using non-linear quantum mechanical effects.

(2) The agent is then placed in a superposition (similar to the implementation in [4]) and performs the requisite tasks. Upon completion of the task and transmission of the results, the agent uses the device to communicate across the superposition using non-linear quantum mechanical interactions such as an interaction between the expectation value of a classical electromagnetic field and the electrons in a detector. Every agent in the superposition participates in this communication channel and the agents collectively establish desired classical states of all the agents in the superposition.

(3) Once the agents agree on their desired states, each agent sets their classical state to the appropriate state.

(4) Permutations of the order of implementation of this protocol are possible: for example, once the agent is placed in a superposition, prior to performing the task, the agents in the superposition may first communicate across the superposition to agree on the desired state. They then perform the task, communicate the results and achieve the appropriate state. Or, the agents in the superposition may first perform the task then communicate across the superposition to agree on a desired state, communicate the results and then set their classical states to the appropriate state. Or, the agent may determine the desired state prior to being placed on a superposition. The agent is then placed in the superposition, performs the task, reports the result and achieves the appropriate state.

(5) In all of the above cases, the device can be used by agents at any time to communicate with all the other agents in the superposition so that the classical states of all agents are always known. The agents can use this communication channel to arrive at a desired set of states and upon reaching such agreement, each agent sets their classical state to the appropriate state.

(6) The operation of such a device need not be in conjunction with the performance of a parallelizable task. Non linear quantum mechanical effects may be diluted due to general time evolution of the quantum system [1,2]. Agents can use a device that is capable of communicating across the quantum mechanical superposition using non-linear quantum mechanical effects to periodically communicate about their classical states and use the results of this communication to suitably alter their classical states in order to minimize the effects of dilution. This communication is efficient if the agent agrees to communicate the agent's classical states at pre-determined time periods. But, the agents can communicate across the superposition to arrive at other protocols as well.

As an example of the above protocol, consider the parallelizable computational problem discussed earlier where the purpose of the computation was to find the input $I_k$ that was the minimum of the set $F[I_1]$, $F[I_2]$, ..., $F[I_N]$ for a given function F and a list of inputs $I_1$, $I_2$, ... Suppose the non-linear quantum mechanical computational protocol is adopted to solve this parallelizable task. A computer system is placed in a superposition of N arms by entangling the computer system with a quantum mechanical system whose Hilbert space has dimension at least N. The computer in each arm is given an input based on the outcome of the entanglement between the computer and the quantum mechanical system (similar to the implementation in [4]). The computer acts on the input, obtains the result and communicates the result across the entire superposition using non-linear quantum mechanical interactions via a radio emitter and detector as described above. The ability of this system to continue to exploit non-linear quantum mechanical interactions can be diluted if the computer system across the entire superposition does not return to classical states that are known across the entire superposition. If the computers in the superposition evolved to classical states that are not known across the superposition, the next time the computer system needs to be placed in a superposition to perform another parallelizable task, the computers whose classical states have evolved to unknown states may not participate in the superposition, thus diluting the effect of the non-linearity for the entire superposition [2].

To tackle this problem, at the end of the computation, the radio emitter in each arm of the superposition can be used to communicate across the entire superposition using the non-linear quantum mechanical interaction so that all the computers communicate their classical states across the superposition. The computers can then agree on maintaining a known set of classical states in each arm of the superposition. This device can also be used periodically to maintain communication across the superposition so that the classical states of the computers are always known.

The fundamental limit on the measurement capabilities of a quantum mechanical system is set by shot noise. Non-linear quantum mechanical effects can be used to improve this shot noise limit and permit more sensitive quantum sensors. To achieve enhanced sensor performance, the following protocol will be used (see FIG. 3):

(1) A device that is capable of communicating across a quantum mechanical superposition using non-linear quantum mechanical interactions is constructed.

(2) An appropriate agent (for example, computer, machine or human) makes a linear quantum mechanical measurement of the quantum system of interest (i.e. a conventional quantum measurement), placing the agent in a quantum mechanical superposition that is entangled with the quantum state of the quantum system of interest.

(3) Depending upon the outcome of that measurement, a signal whose properties are correlated with the outcome of the measurement is created in the device by the agent. The properties of the signal (for example, its strength) in the device depends upon the full quantum state of the measured system. This signal is visible across the entire superposition.

(4) Each agent in the superposition measures the properties of this signal (for example, its strength). These properties depend upon the full quantum state of the measured system.

(5) In each arm of the superposition, the, agent in that arm communicates the measured properties of the signal (for example, the strength) to the agents in all the other arms using the device. The measured signal properties are now known to all the agents in the superposition.

(6) By analyzing these measured properties, the agents in the entire superposition have determined the quantum state of the system.

(7) It is efficient for the assignation of the signal to the correlated outcome of the measurement to be decided prior to the agent being placed in a quantum mechanical superposition. However, this assignation can also be performed after the quantum mechanical superposition has been created by using non-linear quantum mechanical interactions to communicate across the superposition so that the agents in the superposition can agree on appropriate signals.

As an example of the above protocol, consider the problem of measuring the z component of a magnetic field $B_z$. This problem can be tackled by taking a quantum mechanical spin that interacts with the magnetic field (for example, an electron) whose Hilbert space is of dimension 2. This spin is placed along a known direction in the x-y plane, for example, along spin up along the x direction. As a result of the z component of the magnetic field $B_z$, after a time T, the spin in the x-y plane will precess in the x-y plane. For example, the spin that was initially in the spin up state along the x direction will time evolve to a linear combination of spin in the up and down direction in the x direction. The magnetic field $B_z$ sets the coefficients of this linear combination and by measuring these coefficients, the magnetic field $B_z$ can be determined. The accuracy of the measurement of the magnetic field is set by the accuracy of the measurement of the coefficients of the linear combination. Using linear quantum mechanical interactions, the measurements of these coefficients is performed probabilistically. Given a system of N unentangled spins, the statistical accuracy of this measurement is 1/Sqrt[N]. The measurement of the magnetic field is thus limited by the number of spins in the sensor. This is the shot noise limit of this quantum mechanical magnetic field sensor.

A more sensitive magnetic field sensor can be built using the non-linear quantum mechanical measurement protocol described above. To measure the magnetic field $B_z$, we take a single spin and place it along the spin up direction in the x direction. Similar to the linear quantum mechanical measurement protocol, we wait for a time T during which the spin will precess around the x-y plane and become a linear combination of spin up and down along the x direction. The coefficients of this superposition depend upon $B_z$. Non linear quantum mechanical interactions can be used to more accurately measure these coefficients than linear quantum mechanical interactions permitting greater sensitivity to $B_z$.

To achieve this, measure the spin along the x direction. This places the system in a superposition. Depending upon the outcome of the spin measurement, turn on a radio source whose strength is dependent on this outcome. For example, for a spin up measurement, the radio source can be turned on with a power $P_u$ while for spin down it is turned on with a power $P_d$. The values of $P_u$ and $P_d$ should be known across the superposition and it is efficient for these values to be set before the spin is measured along the x direction and the system has been placed in such a superposition. In each arm of the superposition, the radio receiver can be used to detect the power of the radio source from the other arm of the superposition using non linear quantum mechanical interactions (such as the expectation value of the electromagnetic field). The received power depends upon the coefficient of the spin in the other arm and thus a measurement of the received power can be used to determine this coefficient. The advantage of this measurement is that the limit on the accuracy of the coefficient is set by the accuracy of the system used to measure the classical power from the other arm. For a system with a given power detection sensitivity, the measurement accuracy can be increased by increasing the classical power in the arms. This classical power can be more easily increased than the number of spins N that is used in linear quantum mechanical sensors since the latter requires the maintenance of quantum coherence, unlike the former which can be classically increased even in the presence of decoherence.

While certain examples have been described, these are not intended to limit the scope of the inventions. The key concept of these inventions is the use of non-linear quantum mechanical interactions to communicate across the arms of a superposition even in the presence of decoherence. Any embodiment of this key concept would fall within the scope and spirit of these inventions.

REFERENCES (1) J. Polchinski, Weinberg's non-linear quantum mechanics and the EPR Paradox, Phys. Rev. Lett., 66:397-400, 1991
(2) D. E. Kaplan and S. Rajendran, A Causal Framework for Non-Linear. Quantum Mechanics, Physical Review D 105 (2022) 5, 055002
(3) T. W. B. Kibble, Relativistic Models of Nonlinear Quantum Mechanics, Commun. Math. Phys, 64:73-82, 1978
(4) M. Polkovnikov, A. V. Gramolin, D. E. Kaplan, S. Rajendran and A. O. Sushkov, Experimental Limit on non-linear state-dependent terms in Quantum Theory, arXiv:2204.11875

What is claimed is:

1. A Protocol to exploit non-linear quantum mechanical effects to implement and complete any parallelizable classical process by an agent, comprising:
a classical agent that can perform the parallelizable task on a given input;
a quantum system including at least one processor;
an apparatus to place said quantum system in a superposition; a measuring device that can measure said quantum system when it is in said superposition; a device that assigns a specific input to said agent based on the outcome of the measurement of said quantum system by said measuring device and placing said agent in a superposition where said agent is entangled with a specific input; the performance of the parallelizable task by said agent on the assigned input; a device that collects the results of the task performed by said agent on the assigned input; a device that uses non-linear quantum mechanical interactions to broadcast said results and the input assigned to said agents across the entire superposition; a device that receives non-linear quantum mechanical interactions from the entire superposition so that the results of the task on all the inputs in the superposition are known to all the agents in the superposition; a device that uses the results of the task on all the inputs in the superposition to obtain the final result of the parallelizable task.

* * * * *